United States Patent
Oh et al.

(10) Patent No.: US 10,497,263 B2
(45) Date of Patent: Dec. 3, 2019

(54) APPARATUS AND METHOD FOR ESTIMATING A POSITION OF A VEHICLE AND A VEHICLE USING SAME

(71) Applicants: HYUNDAI MOTOR COMPANY, Seoul (KR); KIA MOTORS CORPORATION, Seoul (KR)

(72) Inventors: Youngchul Oh, Seongnam-si (KR); Haeryong Lee, Suwon-si (KR); TaeDong Oh, Suwon-si (KR); Wanjae Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 59 days.

(21) Appl. No.: 15/677,842

(22) Filed: Aug. 15, 2017

(65) Prior Publication Data

US 2018/0247537 A1 Aug. 30, 2018

(30) Foreign Application Priority Data

Feb. 28, 2017 (KR) .......................... 10-2017-0026343

(51) Int. Cl.

| | |
|---|---|
| *G08G 1/16* | (2006.01) |
| *G01C 21/36* | (2006.01) |
| *G01S 19/40* | (2010.01) |
| *G05D 1/00* | (2006.01) |

(Continued)

(52) U.S. Cl.
CPC ......... *G08G 1/161* (2013.01); *G01C 21/3658* (2013.01); *G01S 19/40* (2013.01); *G05D 1/0088* (2013.01); *G08G 1/096791* (2013.01); *G08G 1/166* (2013.01); *B60T 2201/087* (2013.01);

(Continued)

(58) Field of Classification Search
CPC .. G08G 1/161; G08G 1/166; G08G 1/096791; G01C 21/30; G01C 21/3658; G01S 19/40; G05D 1/0088; B60W 2550/308; B60W 2750/306; B60T 2201/087
See application file for complete search history.

(56) References Cited

U.S. PATENT DOCUMENTS

2010/0256852 A1* 10/2010 Mudalige ............... G08G 1/163
    701/24
2015/0274030 A1* 10/2015 Payne .................. B60L 11/1874
    701/22

(Continued)

*Primary Examiner* — Rodney A Butler
(74) *Attorney, Agent, or Firm* — Lempia Summerfield Katz LLC

(57) ABSTRACT

Described are apparatus and method for estimating a position of a vehicle, and a vehicle using the same. A vehicle location estimation apparatus includes a vehicle sensor configured to detect a vehicle, a communication unit configured to receive traveling information of a further vehicle from the further vehicle, and a controller configured to detect a position of the vehicle and a traveling trajectory of the further vehicle based on information of vehicles detected by the vehicle sensor and traveling information of the further vehicle transmitted from the further vehicle, and to predict a traveling route of the further vehicle, to match the predicted traveling route of the further vehicle with an expected traveling route on a map, thereby correcting the position of the vehicle.

20 Claims, 17 Drawing Sheets

(51) Int. Cl.
*G08G 1/09* (2006.01)
*G08G 1/0967* (2006.01)

(52) U.S. Cl.
CPC . *B60W 2550/308* (2013.01); *B60W 2750/306* (2013.01)

(56) References Cited

U.S. PATENT DOCUMENTS

| | | | | |
|---|---|---|---|---|
| 2015/0321665 | A1* | 11/2015 | Pandita | G01C 21/28 701/409 |
| 2016/0012720 | A1* | 1/2016 | Boss | G08G 1/096822 701/118 |
| 2017/0039865 | A1* | 2/2017 | Takabayashi | G08G 1/166 |
| 2018/0052005 | A1* | 2/2018 | Schilling et al. | G01C 21/3691 |
| 2018/0113472 | A1* | 4/2018 | Sakr et al. | G05D 1/0278 |
| 2018/0176740 | A1* | 6/2018 | Goraya et al. | H04W 4/046 |
| 2018/0225970 | A1* | 8/2018 | Mitra et al. | G08G 1/161 |
| 2018/0281814 | A1* | 10/2018 | Murray | B60W 50/0097 |
| 2019/0100199 | A1* | 4/2019 | Ueda | B60W 30/165 |

* cited by examiner (a)                (b)

1. Extract Heading using gradient difference between two line segments

2. Correct position in traveling direction and in width direction

APPARATUS AND METHOD FOR ESTIMATING A POSITION OF A VEHICLE AND A VEHICLE USING SAME

CROSS-REFERENCE TO RELATED APPLICATION

This application claims priority to and the benefit of Korean Patent Application No. 10-2017-0026343, filed on Feb. 28, 2017 in the Korean Intellectual Property Office, the disclosure of which is incorporated by reference in its entirety.

BACKGROUND

Field of the Disclosure

Embodiments of the present disclosure relate to an apparatus and method for estimating the position of a vehicle, and a vehicle using the same.

Description of the Related Art

Recently, many vehicles install various additional service apparatuses therein in order to improve a driver's safety and convenience.

More specifically, additional service apparatuses for vehicle include a safety assistance apparatus, such as a lane departure warning system for assisting a driver's steering operation during driving to prevent a vehicle from departing from the traveling lane, and an additional service providing apparatus such as a navigation system for guiding a path to a driver's selected destination and surrounding information according to the path.

Also, a technique that utilizes a sensor mounted on a vehicle to recognize geographic features and lanes around the vehicle for autonomous driving has been applied.

Because a vehicle travels under various traffic conditions, it is useful to determine an accurate position of the vehicle for autonomous driving. However, there are cases in which it is difficult to accurately recognize lanes due to objects around the vehicle.

SUMMARY

One aspect of the present disclosure provides an apparatus and method for determining a traveling trajectory and a predicted route of another vehicle around a vehicle through Vehicle to Everything (V2X) communication between a sensor mounted on the vehicle and the other vehicle, and estimating the position of the vehicle based on the traveling trajectory and the predicted route of the other vehicle, and a vehicle using the apparatus and method.

In accordance with one aspect of the present disclosure, a vehicle location estimation apparatus includes a vehicle sensor configured to detect a vehicle, a communication unit configured to receive traveling information of another vehicle from the other vehicle and a controller configured to detect a position of the vehicle and a traveling trajectory of the other vehicle based on information of vehicles detected by the vehicle sensor and traveling information of the other vehicle transmitted from the other vehicle, and to predict an expected traveling route of the other vehicle, to match the predicted traveling route of the other vehicle with an expected traveling route on a map, thereby correcting the position of the vehicle.

The information of vehicles detected by the vehicle sensor includes at least one of relative coordinates and speed of the other vehicle with respect to the vehicle.

The other vehicle traveling information includes at least one of absolute coordinates, a travel mode, a yaw rate, speed and travel lane information of the other vehicle.

The controller may predict the expected traveling route of the other vehicle using the yaw rate and the speed of the other vehicle transmitted from the other vehicle.

The communication unit may perform Vehicle to Everything (V2X) communication with the other vehicle.

The controller may detect the traveling trajectory of the other vehicle determined as a valid vehicle in consideration of whether or not the other vehicle allows V2X communication and whether or not the other vehicle includes a lane recognition sensor.

The controller may assign a weight for each traveling route in consideration of whether or not a driver of the other vehicle drives, the traveling trajectory of the other vehicle, whether or not there is another vehicle communication matched, and whether or not lane correction is possible, and may consider the weight for each traveling route when correcting the position of the vehicle.

The determination on whether lane correction is possible includes a determination of whether or not Vehicle to Everything (V2X) communication is allowed and whether or not a lane recognition sensor is present.

The controller may calculate the weight for each traveling route by summing values of items of: whether or not a driver drives, the traveling trajectory of the other vehicle, whether or not there is another vehicle communication matched, and whether or not lane correction is possible.

The controller may normalize the weight for each traveling route.

The controller may apply the normalized weight for each traveling route to a gradient difference and position correction vectors of a width-direction position and a traveling-direction position for the traveling route to thereby correct the position of the vehicle.

In accordance with one aspect of the present disclosure, a method of estimating a position of a vehicle includes detecting information of vehicles through a vehicle sensor provided in the vehicle, or acquiring traveling information of another vehicle through communication with the other vehicle, converting a position of the other vehicle into absolute coordinates using the information of vehicles detected through the vehicle sensor and the traveling information of the other vehicle, detecting a position of the vehicle and a traveling trajectory of the other vehicle based on the information of vehicles and the traveling information of the other vehicle, predicting an expected traveling route of the other vehicle, matching the predicted traveling route of the other vehicle with an expected traveling route on a map to extract position correction information for each traveling route and correcting the position of the vehicle based on the position correction information for each traveling route.

The traveling information of the other vehicle may include at least one of absolute coordinates, a traveling mode, a yaw rate, speed, and traveling lane information of the other vehicle.

Predicting the expected traveling route of the other vehicle may include predicting an expected traveling route of the other vehicle using the yaw rate and the speed of the other vehicle transmitted from the other vehicle.

Acquiring the traveling information of the other vehicle may include receiving traveling information of the other vehicle transmitted from the other vehicle through Vehicle to Everything (V2X) communication with the other vehicle.

Detecting of the traveling trajectory of the other vehicle may include detecting a traveling trajectory of the other vehicle determined as a valid vehicle in consideration of whether or not the other vehicle allows V2X communication and whether or not the other vehicle includes a lane recognition sensor.

The method of estimating the position of the vehicle may further include, after extracting the position correction information for each traveling route, before extracting the position correction information for each traveling route to correct the position of the vehicle, assigning a weight for each traveling route in consideration of whether or not a driver of the other vehicle drives, the traveling trajectory of the other vehicle, whether or not there is another vehicle communication matched, and whether or not lane correction is possible. Correcting the position of the vehicle may include considering the weight for each traveling route in connection with the position correction information for each traveling route.

Assigning the weight for each traveling route may include calculating the weight for each traveling route by summing values of items of: whether or not a driver drives, the traveling trajectory of the other vehicle, whether or not there is another vehicle communication matched, and whether or not lane correction is possible, and normalizing the weight for each traveling route.

Correcting the position of the vehicle may include applying the normalized weight for each traveling route to a gradient difference and position correction vectors of a width-direction position and a traveling-direction position for the traveling route to thereby correct the position of the vehicle.

In accordance with one aspect of the present disclosure, a vehicle includes a vehicle sensor configured to detect the vehicle and another vehicle, a communication unit configured to receive traveling information of the other vehicle from the other vehicle, and a controller configured to detect a position of the vehicle and a traveling trajectory of the other vehicle based on information of vehicles detected by the vehicle sensor and the traveling information of the other vehicle transmitted from the other vehicle, to predict an expected traveling route of the other vehicle, and to match the predicted traveling route of the other vehicle with an expected traveling route on a map, thereby correcting the position of the vehicle.

The controller may assign a weight for each traveling route in consideration of whether or not a driver of the other vehicle drives, the traveling trajectory of the other vehicle, whether or not there is another vehicle communication matched, and whether or not lane correction is possible, and may consider the weight for each traveling route when correcting the position of the vehicle.

The communication unit may perform Vehicle to Everything (V2X) communication with the other vehicle.

DETAILED DESCRIPTION

Figure 1:
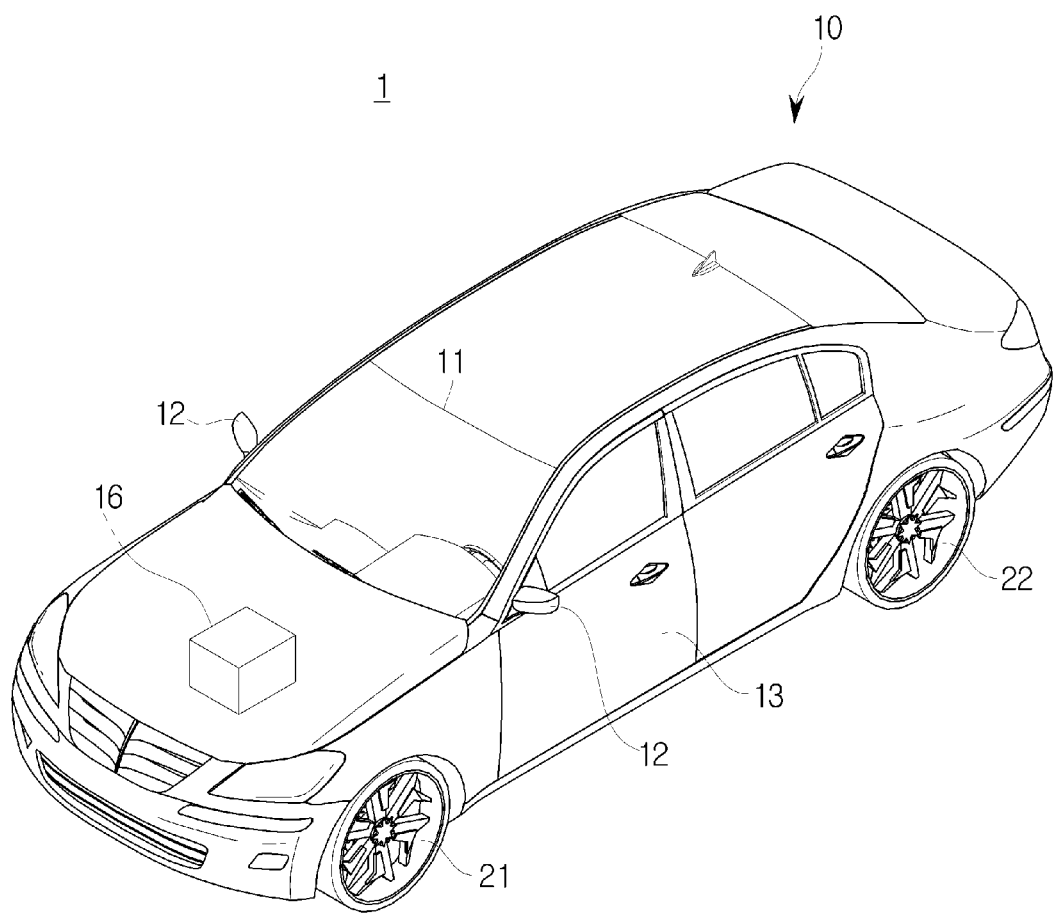
FIG. 1 shows an exterior of a vehicle.

Like numerals refer to like elements throughout the specification. The present specification will not describe all components of embodiments, and descriptions about general content in the technical art to which the present disclosure belongs or overlapping content between the embodiments will be omitted. As used in the specification, the terms "part", "module", "member", and "block" may be implemented as software or hardware, and may be implemented as a single element or a plurality of elements.

In this specification, it will be understood that the case in which a certain part is "connected" to another part includes the case in which the part is "indirectly connected" to the other part, as well as the case in which the part is "directly connected" to the other part. The case in which the part is "indirectly connected" to the other part includes the case in which the part is connected to the other part through a wireless communication network.

Also, it will be understood that when a certain part "includes" a certain component, the part does not exclude another component but can further include another component, unless the context clearly dictates otherwise.

Also, the terms "first", "second", etc. are used to distinguish a component from another one, and the components are not limited by the terms.

Also, it is to be understood that the singular forms "a," "an," and "the" include plural references unless the context clearly dictates otherwise.

Reference numerals mentioned in the following descriptions about operations are just used for convenience of description, but not for limiting the order of the operations. Thus, the operations may be performed in a different order, unless the order of the operations is specifically written in the context.

The operation principle and embodiments of the present disclosure will now be described with reference to accompanying drawings.

FIG. 1 shows the exterior of a vehicle.

Referring to FIG. 1, a vehicle 1 may include a main body 10 forming the exterior of the vehicle 1, a windscreen 11 configured to provide a driver with a front view of the vehicle 1, a plurality of side-view mirrors 12 configured to provide the driver with rear and side views of the vehicle 1, a plurality of doors 13 configured to shield the interior of the vehicle 1 from the outside, and a plurality of wheels 21 and 22 including front wheels 21 located in the front part of the vehicle 1 and rear wheels 22 located in the rear part of the vehicle 1 to move the vehicle 1.

The windscreen 11 may be mounted on the upper front part of the main body 10 to enable a driver inside the vehicle 1 to obtain information about a front view of the vehicle 1. The side-view mirrors 12 may include a left side-view mirror located to the left of the main body 10, and a right side-view mirror located to the right of the main body 10 to help the driver obtain side and rear views of the vehicle 1.

The doors 13 may be rotatably provided to the left and right of the main body 10 to allow the driver to open one of them and get into the vehicle 10. Also, the doors 13 may shield the interior of the vehicle 1 from the outside when all of them close.

In addition to the above-described components, the vehicle 1 may include a power apparatus 16 configured to rotate the wheels 21 and 22, a steering apparatus (not shown) configured to change the movement direction of the vehicle 1, and a brake apparatus (not shown) configured to stop movement of the wheels 21 and 22.

The power apparatus 16 may provide the front wheels 21 or the rear wheels 22 with rotatory power so that the main body 10 can move forward or backward. The power apparatus 16 may include an engine to burn fossil fuel to produce rotatory power, or a motor to receive power from a condenser (not shown) to produce rotatory power.

The steering apparatus may include a steering handle (42 of FIG. 2) configured to receive a driving direction from the driver, a steering gear (not shown) configured to change a rotatory motion of the steering handle 42 to a reciprocating motion, and a steering link (not shown) configured to transfer the reciprocating motion of the steering gear (not shown) to the front wheels 21. The steering apparatus may change the directions of the rotation shafts of the wheels 21 and 22, thereby changing the driving direction of the vehicle 1.

The brake apparatus may include a brake pedal (not shown) configured to receive a brake manipulation from the driver, a brake drum (not shown) coupled with the wheels 21 and 22, and a brake shoe (not shown) configured to brake the rotation of the brake drum using a friction force. The brake apparatus may brake the driving of the vehicle 1 by stopping rotation of the wheels 21 and 22.

Figure 2:
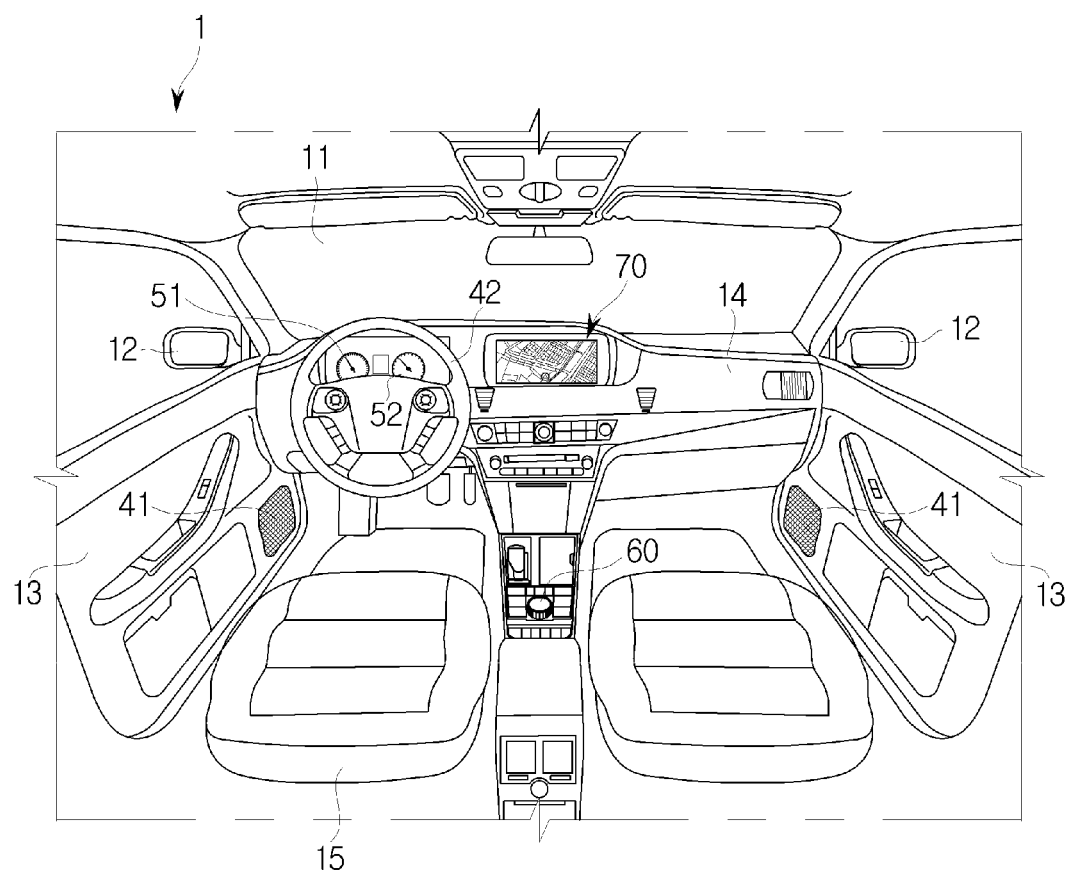
FIG. 2 shows an interior of a vehicle.

FIG. 2 shows the interior of a vehicle.

In the interior of the vehicle 1, a dashboard 14 in which various kinds of devices for enabling a driver to manipulate the vehicle 1 are installed, a driver seat 15 on which the driver is seated, cluster displays 51 and 52 configured to display operation information of the vehicle 1, and navigation system 70 configured to provide an audio function and a video function in addition to a navigation function for providing route guidance information according to the driver's manipulation command, may be provided.

The dashboard 14 may protrude toward the driver from the lower portion of the windscreen 11 to enable the driver to manipulate various kinds of devices installed in the dashboard 14 while keeping his/her eyes forward.

The driver seat 15 may be disposed behind the dashboard 14 so that the driver can drive the vehicle 1 in a comfortable position while keeping his/her eyes forward and on the various kinds of devices of the dashboard 14.

The cluster displays 51 and 52 may be disposed on the dashboard 14 around the driver seat, and may include a driving speed gauge 51 to display the driving speed of the vehicle 1, and a revolutions per minute (rpm) gauge 52 to display the rpm of the power apparatus (not shown).

The navigation system 70 may include a display configured to display information about a road on which the vehicle 1 travels or about a route to the driver's desired destination, and a speaker 41 configured to output sound according to the driver's manipulation command. Recently, many vehicles include an Audio Video Navigation (AVN) system into which audio system, video system, and navigation system are integrated.

The navigation system 70 may be installed in a center fascia. The center fascia is a control panel of the dashboard 14 disposed between the driver seat and a passenger seat. The center fascia may be positioned at an area where the dashboard 14 meets a shift lever vertically, and in the center fascia, the navigation system 70, an air conditioner, a controller of a heater, a vent, a cigar jack, an ashtray, a cup holder, etc. may be installed. Also, the center fascia may function to divide the driver seat from the passenger seat, together with a center console.

Also, a jog dial 60 may be provided to enable the driver to manipulate the various kinds of devices as well as the navigation system 70.

The jog dial 60 according to the present disclosure may enable the driver to rotate the jog dial 60 or apply pressure thereon to perform driving manipulations, and the jog dial 60 may also include a touch pad having a touch recognition function to perform handwriting recognition for driving manipulations using a user's finger or a tool having a touch recognition function.

Most vehicles maintain their traveling lanes when traveling on roads. If it is possible to accurately predict a traveling trajectory and a traveling route of another vehicle around a vehicle, the results of the prediction are able to be used to estimate the position of the vehicle by matching the results with a route for each lane on a map. A position estimation apparatus 100 disclosed below may estimate the position of the vehicle 1 using the above-described principle.

Figure 3:
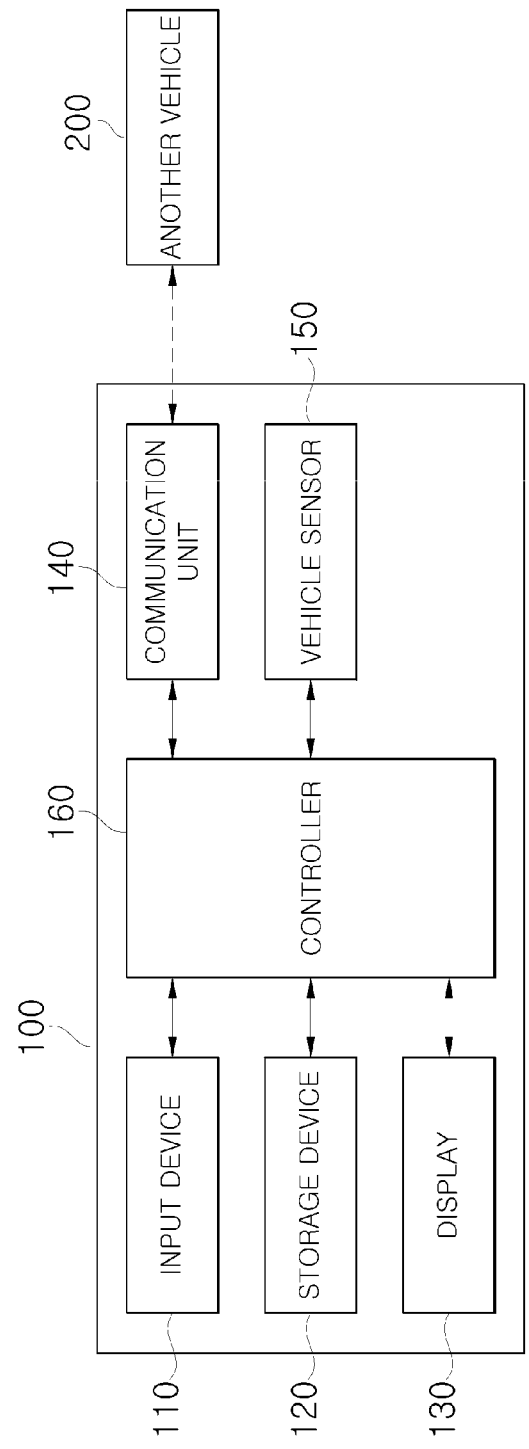
FIG. 3 is a block diagram showing the configuration of a position estimation apparatus of the vehicle.

FIG. 3 is a control block diagram showing the configuration of a position estimation apparatus of the vehicle in detail.

Figure 4:
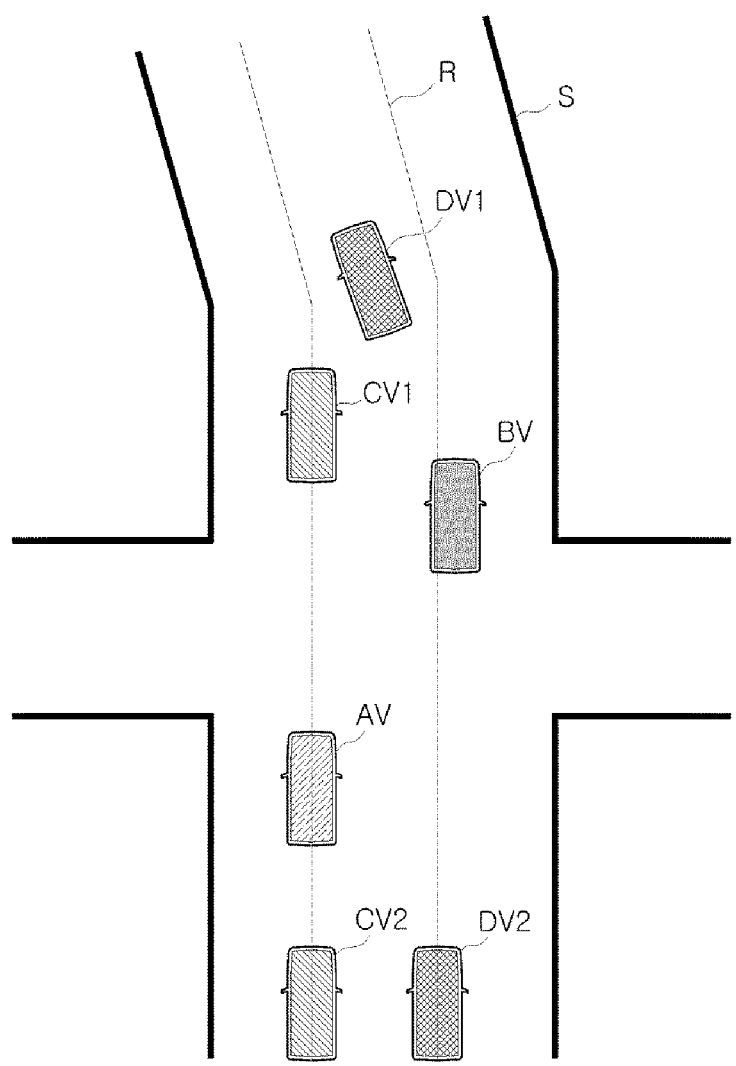
FIG. 4 shows a traveling environment of the vehicle.
Figure 5:
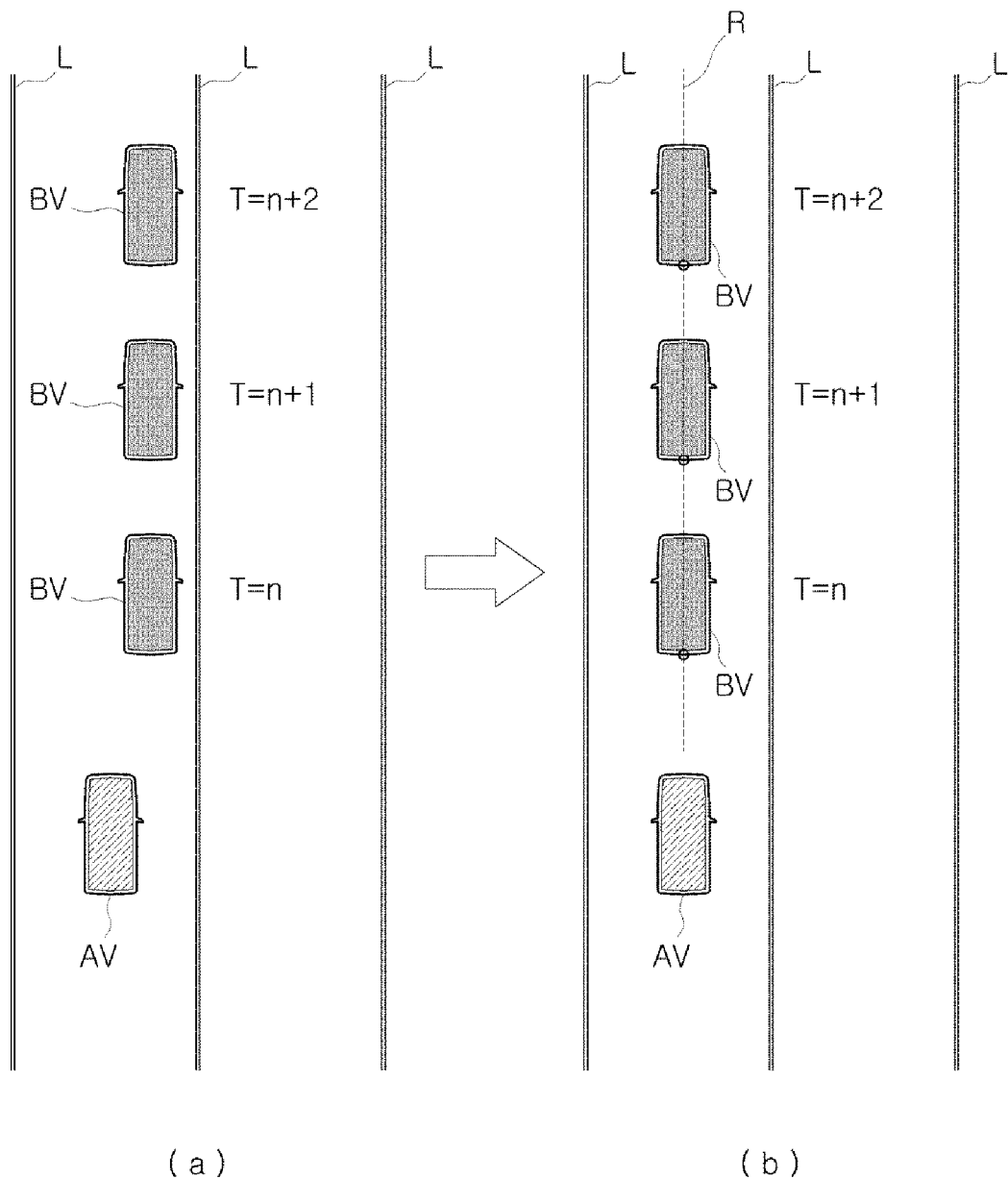
FIGS. 5 to 7 are views for describing a method of detecting a traveling trajectory of the vehicle.
Figure 6:
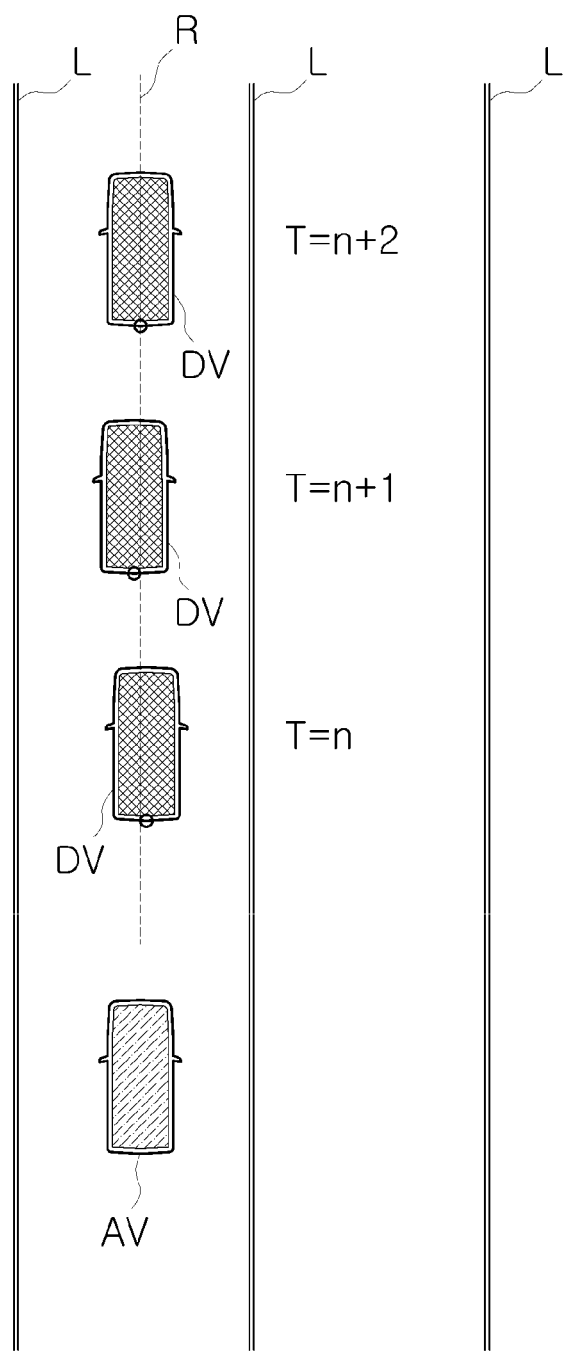
Figure 7:
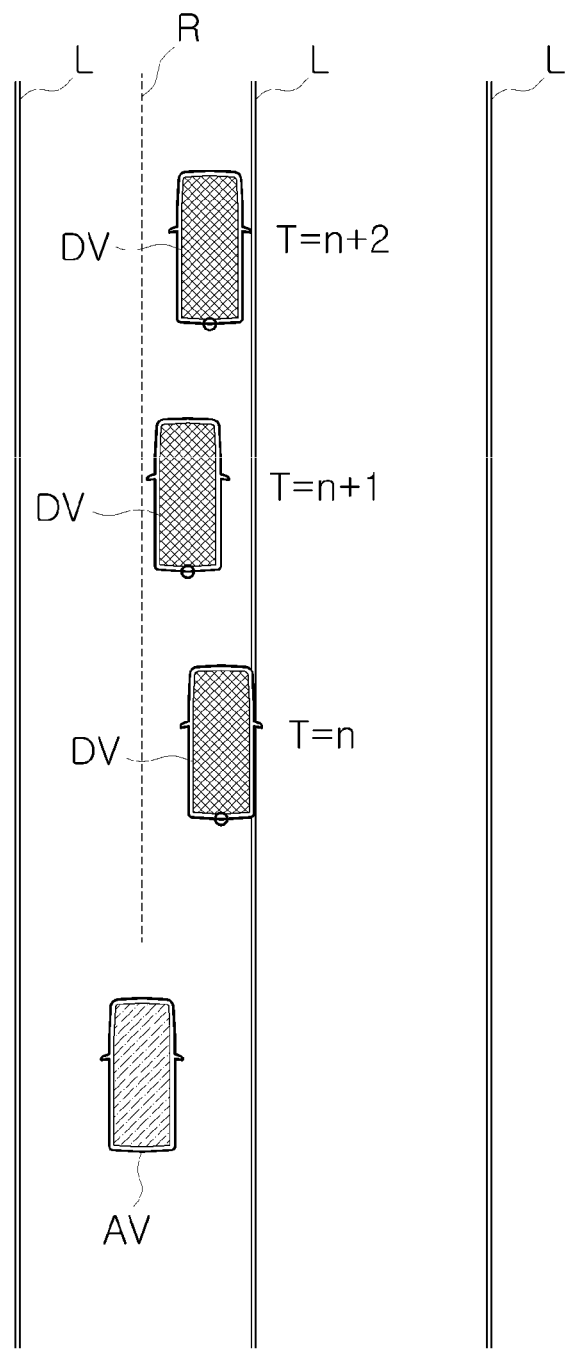
Figure 12:
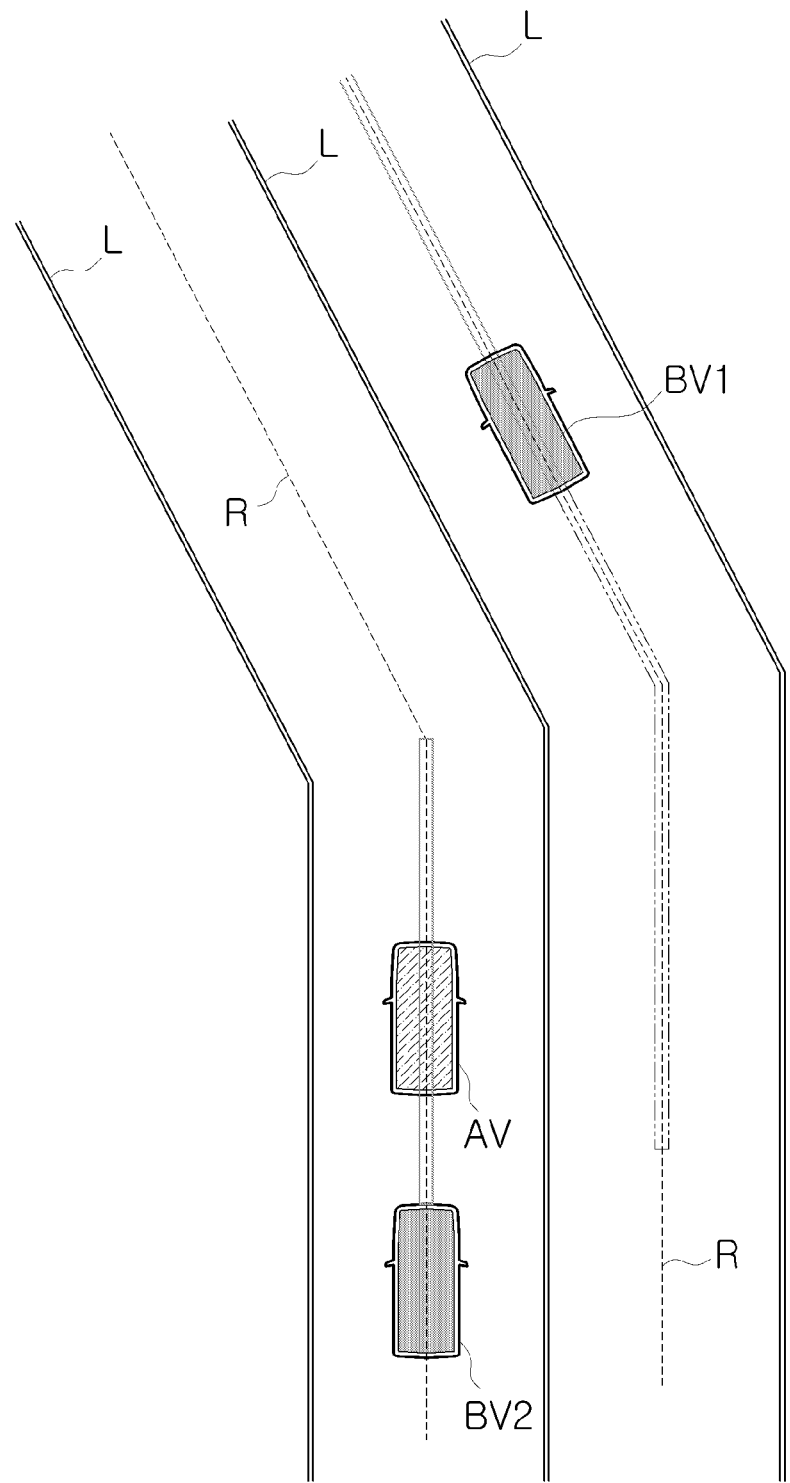
FIGS. 12 to 14 are views for describing a method of matching an expected traveling route of another vehicle with a map.
Figure 13:
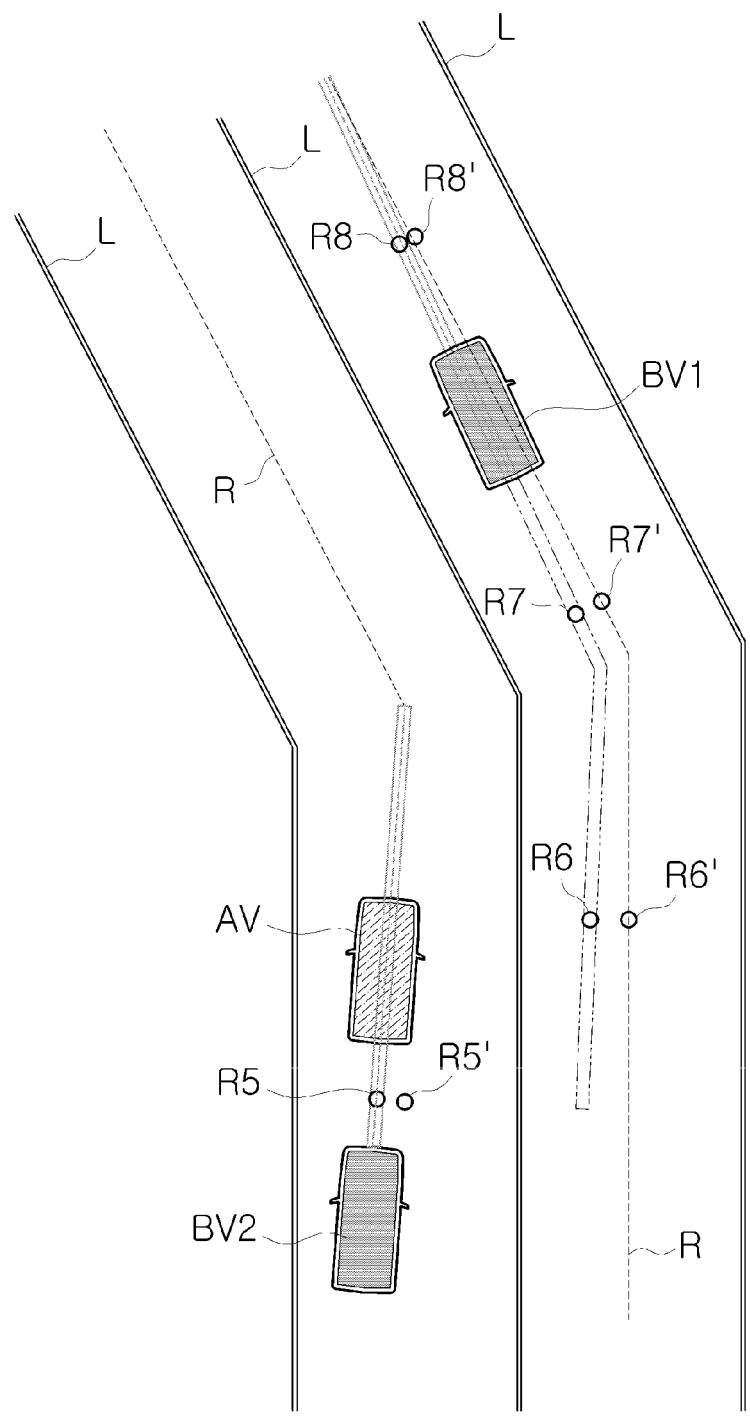
Figure 14:
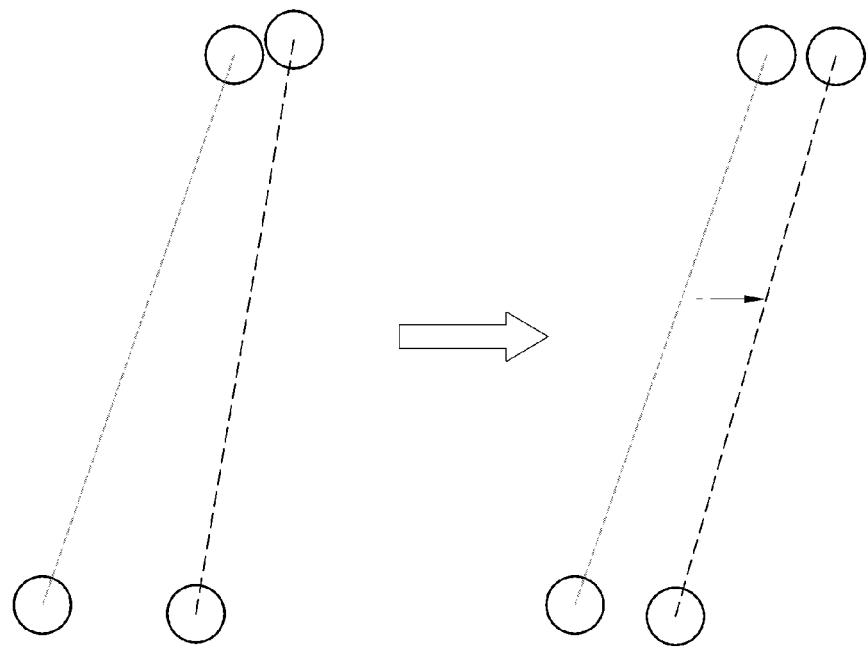

FIG. 4 shows a traveling environment of the vehicle, FIGS. 5 to 7 are views for describing a method of detecting a traveling trajectory of the vehicle, FIGS. 8 to 11 are views for describing a method of predicting an expected traveling route of another vehicle, and FIGS. 12 to 14 are views for describing a method of matching an expected traveling route of another vehicle with a map.

The following description is given with reference to FIGS. 4 to 14.

Referring to FIG. 3, the position estimation apparatus 100 may include an input device 110, a storage device 120, a display 130, a communication unit 140, a vehicle sensor 150, and a controller 160.

The input device 110 may include a hardware device for receiving a user's inputs, such as a plurality of buttons or switches, a pedal, a keyboard, a mouse, a track ball, various levers, a handle, or a stick.

The input device 110 may also include a software device for receiving the user's inputs, such as a Graphical User Interface (GUI) including a touch pad, etc. The touch pad may be implemented with a Touch Screen Panel (TSP), thus forming an interlayer structure with the display 130.

The storage device 120 may store various information related to the position estimation apparatus 100. For example, the storage device 120 may include a map, criterion for estimating the position of the vehicle, traveling information transmitted from another vehicle 200, sensing information sensed through the vehicle sensor 150, and the like.

The storage device 120 may be at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), ora storage medium, such as Hard Disk Drive (HDD) or Compact Disk-ROM (CD-ROM), although not limited to these. The storage device 120 may be implemented as a separate chip from a processor, or may be integrated into a processor to be implemented as a single chip.

The display 130 may display various information related to the position estimation apparatus 100. The display 130 may be implemented as a display of the navigation system (70 of FIG. 2), although not limited thereto. According to another example, the display 130 may be implemented as a separate display.

The display 130 may include a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, etc., although not limited thereto.

The communication unit 140 may receive traveling information of the other vehicle 200 from the other vehicle 200. The communication unit 140 may perform Vehicle to Everything (V2X) communication with the other vehicle 200. The V2X communication is vehicular communication system technology for enabling a vehicle to exchange or share information such as traffic conditions with other vehicles by communicating with road infrastructure and the other vehicles during traveling.

The communication unit 140 may include one or more components for enabling communication with an external device. For example, the communication unit 140 may include at least one of a short-range communication module, a wired communication module, and a wireless communication module. The short-range communication module may include various kinds of short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range. The wired communication module may include various cable communication modules, such as a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various kinds of wired communication modules, such as a Controller Area Network (CAN) communication module, a Local Area Network (LAN) module, a Wide Area Network (WAN) module, a Value Added Network (VAN) module, and the like. The wireless communication module may include wireless communication modules supporting various wireless communication methods, such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as a Radio Data System-Traffic Message Channel (RDS-TMS), Digital Multimedia Broadcasting (DMB), a Wireless-Fidelity (Wi-Fi) module, and a Wireless Broadband (Wibro) module. The wireless communication module may include a wireless communication interface including an antenna and a receiver to receive traffic information signals. Also, the wireless communication module may further include a traffic-information signal conversion module to demodulate an analog radio signal received through the wireless communication interface into a digital control signal. The vehicle sensor 150 may detect a vehicle. The vehicle sensor 150 may detect the position of another vehicle 200 located around the vehicle 1 on a road on which the vehicle 1 travels. However, the vehicle sensor 150 may detect an obstacle, such as a wall, a curb, and a bar, around the vehicle 1.

The vehicle sensor 150 may include a stereo camera, a camera, a radar sensor, a lidar sensor, an ultrasonic sensor, and the like for detecting the driving state of the vehicle 1 or the other vehicle 200. Also, the vehicle sensor 150 may further include a Steering Angle Sensor (SAS), a Wheel Speed Sensor (WSS), a yaw rate sensor, a Global Positioning System (GPS) sensor, a lane recognition sensor, etc. The vehicle sensor 150 may be provided not only in the vehicle 1 but also in the other vehicle 200. The controller 160 may detect the position of the vehicle 1 and the traveling trajectory of the other vehicle 200, based on information of vehicles detected from the vehicle sensor 150 and traveling information of the other vehicle 200 transmitted from the other vehicle 200, predict an expected traveling route of the other vehicle 200, and then match the expected traveling route of the other vehicle 200 with an expected traveling route on a map, thereby correcting the position of the vehicle 1.

The information of vehicles detected from the vehicle sensor 150 may include at least one of the relative coordinates and speed of the other vehicle 200 with respect to the vehicle 1.

The traveling information of the other vehicle 200 may include at least one of the absolute coordinates, traveling mode, yaw rate, speed, and traveling lane information of the other vehicle 200. The traveling lane information means a distance between the position of the other vehicle 200 and the lane, and may be used to correct the position of the other vehicle 200 in a width direction by a lane offset. More specifically, the controller 160 may detect a traveling trajectory of a valid vehicle 200 in consideration of whether or not the vehicle 200 is capable of performing V2X communication and whether or not the vehicle 200 includes a lane recognition sensor. That is, the controller 160 may detect only the traveling trajectory of a valid vehicle 200 determined to be able to be used for correcting the position of the vehicle 1, among other vehicles 200 detected by the vehicle sensor 150. Determination on whether the other vehicle 200 is capable of performing V2X communication means determination of whether or not the other vehicle 200 has a V2X communication function to perform V2X communication with the vehicle 1 and matches with the position of the other vehicle 200 detected by the vehicle 1.

Referring to FIG. 4, other vehicles BV, CV1, CV2, DV1, and DV2 having various characteristics may travel around a vehicle AV. The various characteristics may include characteristics, such as whether or not the other vehicles BV, CV1, CV2, DV1, and DV2 are capable of performing V2X communication with the vehicle AV, whether or not the other vehicles BV, CV1, CV2, DV1, and DV2 include a lane recognition sensor, and the like. For example, the other vehicles BV, CV1, CV2, DV1, and DV2 may include a vehicle BV that can perform V2X communication with the vehicle AV to enable V2X matching, vehicles CV1 and CV2 that can perform V2X communication with the vehicle AV to enable V2X matching but include no lane recognition sensor, and vehicles DV1 and DV2 that have vehicle sensors but disallow V2X communication. The other vehicle BV equipped with the lane recognition sensor is capable of transmitting driving lane information indicating a distance between its own position and a lane in which the vehicle BV travels currently, when transmitting traveling information to the vehicle AV. In FIG. 4, S denotes a stop structure on the map, and R denotes a traveling route (traveling trajectory) on the map.

The controller 160 may detect the traveling trajectory of the other vehicle 200 when the other vehicles BV, CV1, CV2, DV1, and DV2 having various characteristics travel together as shown in FIG. 4. The controller 160 may detect the traveling trajectory of a valid vehicle 200 in consideration of whether or not the other vehicles BV, CV1, CV2, DV1, and DV2 are capable of performing V2X communication and whether or not the other vehicles BV, CV1, CV2, DV1, and DV2 include a lane recognition sensor. Thereby, it is possible to improve the reliability of the traveling trajectory and the expected traveling route of the other vehicle 200 for correcting the position of the vehicle 1.

Referring to FIG. 5, the controller 160 may detect the position of the other vehicle BV capable of performing V2X communication with the vehicle AV to be V2X matched with the vehicle AV, and includes a lane recognition sensor, at predetermined time intervals (T=n, n+1, n+2), to thus detect a traveling trajectory, such as R of FIG. 5. In FIG. 5, L represents a lane.

The actual position of the other vehicle BV detected first by the controller 160 is shown in portion (a) of FIG. 5. The controller 160 may correct the position of the other vehicle BV in the width direction by a lane offset based on traveling lane information received through V2X communication to obtain a traveling trajectory R as shown in portion (b) of FIG. 5. The controller 160 may correct the position of the other vehicle BV using the traveling lane information so that the other vehicle BV is positioned at the center of the lane in the width direction. A history of the traveling trajectory of the detected other vehicle BV may be stored in the storage unit 120. Also, the controller 160 may assign a higher weight to the other vehicle BV capable of performing V2X communication with the vehicle AV and includes a lane recognition sensor, than to the other vehicles having the other characteristics.

Referring to FIGS. 6 and 7, the controller 160 may detect the position of the other vehicle DV having a vehicle sensor at predetermined time intervals (T=n, n+1, n+2), using the vehicle sensor 150, to thereby detect a traveling movement R as shown in FIGS. 6 and 7. The traveling trajectory of the other vehicle DV may be detected from the center of a lane L in the width direction as shown in FIG. 6. However, the other vehicle DV may be detected from the left or right side of a lane L as shown in FIG. 7, because the other vehicle DV is not capable of performing V2X communication, even though the other vehicle DV has a vehicle sensor. Accordingly, the controller 160 may assign a lower weight to the other vehicle DV not capable of performing V2X communication even though the other vehicle DV has a vehicle sensor, than to the other vehicles having the other characteristics. The controller 160 may predict an expected traveling route of the other vehicle 200 using the yaw rate and speed of the other vehicle 200 transmitted from the other vehicle 200. The yaw rate and speed of the other vehicle 200 may be transmitted to the vehicle 1 at predetermined time intervals through the V2X communication.

Figure 8:
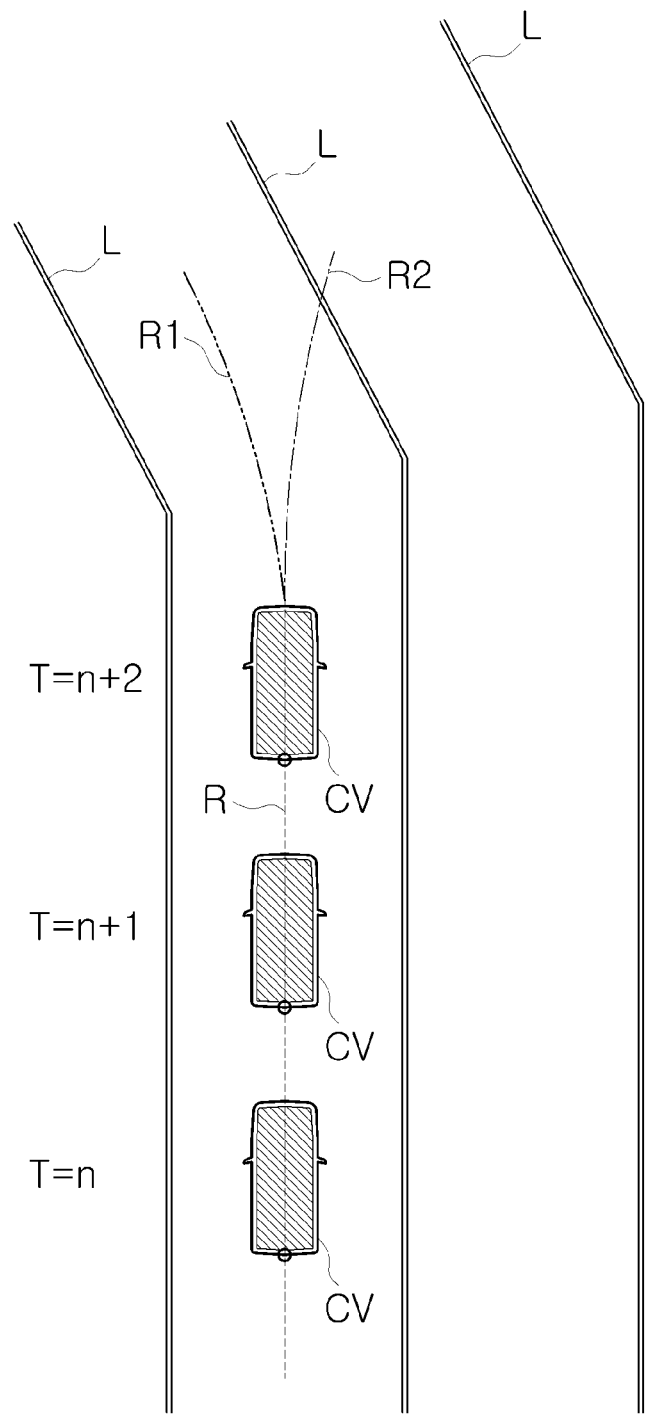
FIGS. 8 to 11 are views for describing a method of predicting an expected traveling route of another vehicle.

Referring to FIG. 8, the controller 160 may detect the position of the other vehicle CV capable of performing V2X communication with the vehicle AV to be V2X matched with the vehicle AV, at predetermined time intervals (T=n, n+1, n+2), to detect a traveling trajectory R, and predict an expected traveling route of the other vehicle CV using a yaw rate and speed transmitted from the other vehicle CV.

At this time, if the predicted traveling route has a high degree of matching with an expected traveling route on the map, as if it is R1, the controller 160 may assign a high traveling route weight to the corresponding vehicle. In contrast, when the predicted traveling route is a low degree of matching with the expected traveling route on the map, as if it is R2, the controller 160 may assign a relatively low traveling route weight to the corresponding vehicle. The predicted traveling route R2 may be acquired when no lane correction is performed because the other vehicle CV includes no lane recognition sensor. In the case of the other vehicle BV, because the other vehicle BV includes a lane recognition sensor, a predicted traveling route with respect to the other vehicle BV may be assigned a higher weight than the predicted traveling route with respect to the other vehicle CV.

Figure 9:
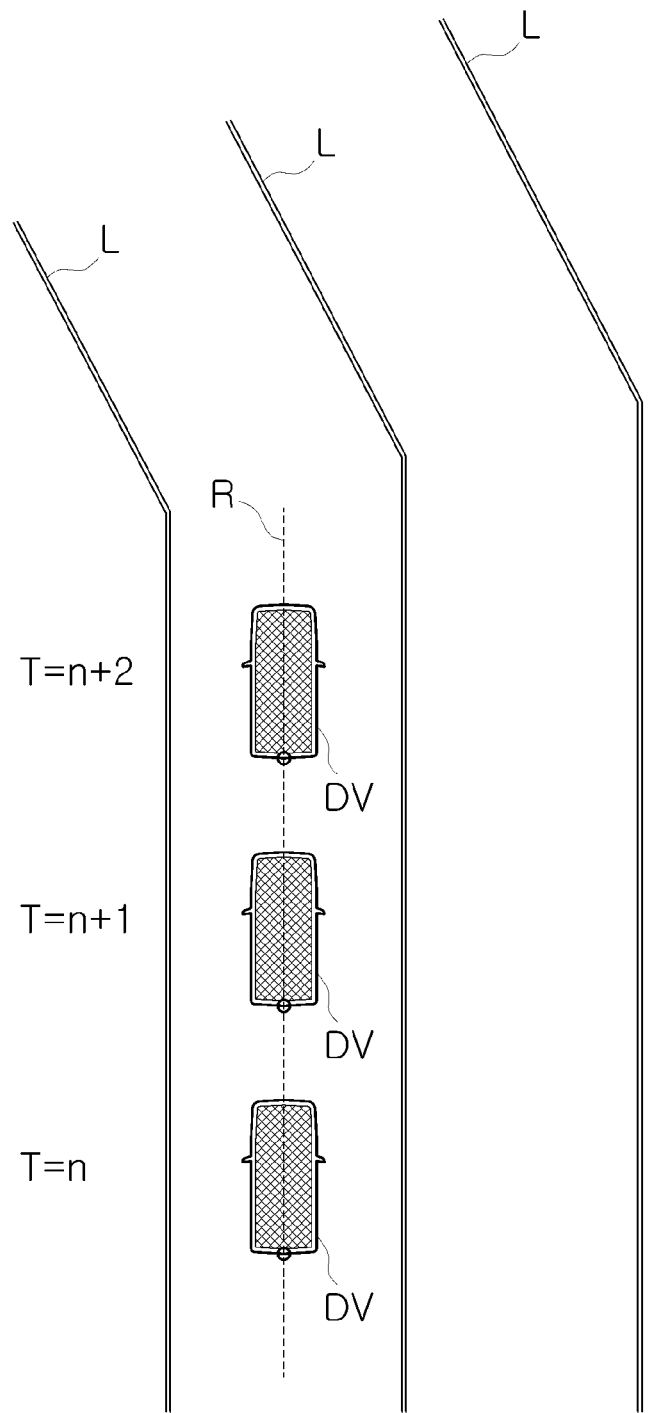

Referring to FIG. 9, the controller 160 may detect the position of the other vehicle DV having a vehicle sensor at predetermined time intervals (T=n, n+1, n+2), using the vehicle sensor 150, to thereby detect a traveling trajectory R based on the detected position of the other vehicle DV, and predict an expected traveling route of the other vehicle DV. However, because the other vehicle DV is not capable of performing V2X communication, the controller 160 may assign a relatively low weight to the other vehicle DV, than to the other vehicles (for example, vehicles BV and CV) having the other characteristics.

Meanwhile, the controller 160 may predict an expected traveling route of another vehicle 200 located behind the vehicle AV, using the yaw rate and speed of the other vehicle 200 transmitted from the other vehicle 200.

Figure 10:
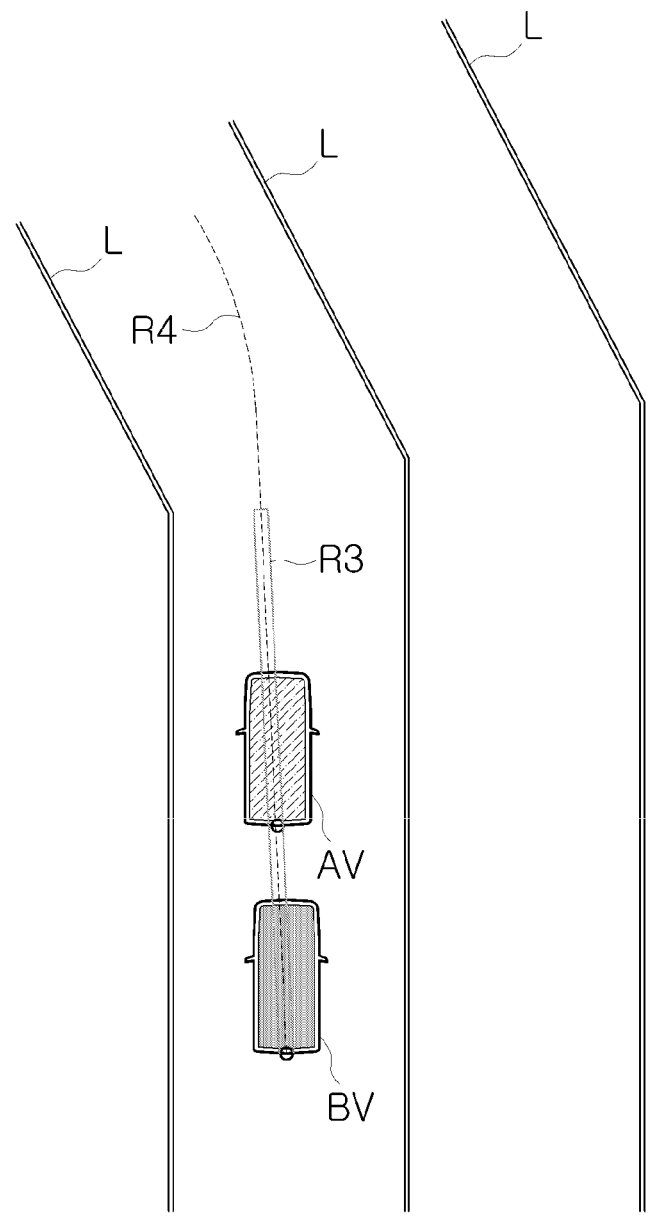
Figure 11:
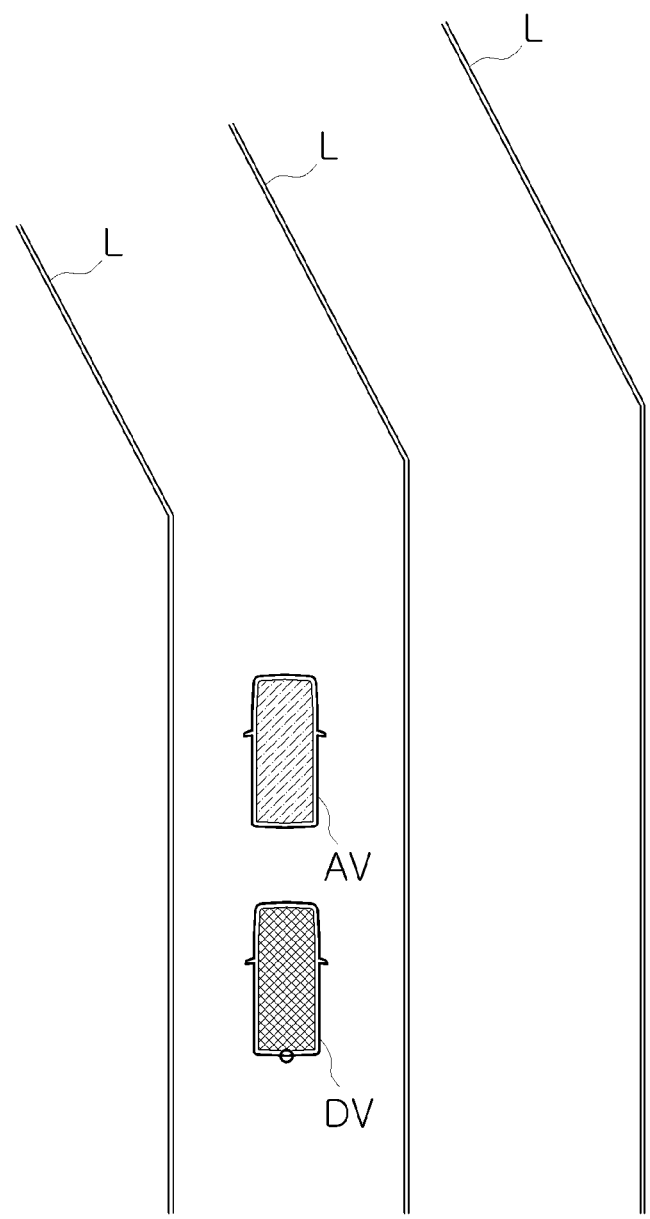

Referring to FIG. 10, when another vehicle BV capable of performing V2X communication and includes a lane recognition sensor so that the relative position of the other vehicle BV may be accurately measured, the controller 160 may predict an expected traveling route of the other vehicle BV and match the predicted traveling route of the other vehicle BV with the map to use the result of the matching for position correction of the vehicle AV.

Also, the controller 160 may limit a maximum value of a valid traveling section (for example, R4 in FIG. 10) and the valid traveling section (for example, R3 in FIG. 10), based on the current speed of the vehicle AV, when predicting an expected traveling route based on another vehicle 200 located behind the vehicle AV.

A method of predicting an expected traveling route based on another rear vehicle may be implemented when the vehicle 1 travels on a road (for example, an intersection) on which no vehicle exists ahead or when the vehicle 1 travels on a road on which no vehicle exists ahead of or around the vehicle 1, although not limited thereto.

If the rear vehicle DV is not capable of performing V2X communication even though the rear vehicle DV has a vehicle sensor, it may not be useful to use only the traveling trajectory of the rear vehicle DV for position correction of the vehicle AV, because a situation occurring ahead of the vehicle AV is important. That is, if the position of the vehicle AV is corrected only based on the position of the rear vehicle DV measured by the vehicle AV when the vehicle AV is not capable of performing real-time V2X communication with the rear vehicle DV, the reliability of the result of position correction may be relatively low.

The controller 160 may match the predicted traveling route of the other vehicle 200 with an expected traveling route on the map to thereby correct the position of the vehicle 1.

FIG. 12 shows the actual positions of a vehicle AV and other vehicles BV1 and BV2. Due to an error in position of the vehicle AV, the position of the vehicle AV and the positions of the other vehicles BV1 and BV2 may have errors as shown in FIG. 13.

In this case, the controller 160 may straighten a predicted traveling route of the other vehicle 200 in the shape of a curved line, and match the resultant predicted traveling route with an expected traveling route on the map for each traveling route.

The controller 160 may match the predicted traveling route of the other vehicle 200 with the expected traveling route on the map for each traveling route, based on an angle formed between the corresponding straight lines and a distance error. Referring to FIG. 13, the controller 160 may extract position correction information after matching because the gradients and the distance differences of straight-line sections R5 and R5', R6 and R6', R7 and R7', and R8 and R8' in the traveling route are within reference values.

That is, the controller 160 may extract heading information based on a gradient difference for each traveling route, and extract positional error information in the traveling direction and in the width direction for each traveling route, thereby correcting the gradient of the vehicle 1 and the position of the vehicle 1 in the traveling direction and in the width direction, as shown in FIG. 14.

The heading information of the vehicle 1 may mean an angle indicating the traveling direction of the vehicle 1, formed in a clockwise direction with respect to the north.

Meanwhile, the controller 160 may assign a weight for each traveling route in consideration of whether or not a driver of the other vehicle 200 drives, the traveling trajectory of the other vehicle 200, whether or not there is another vehicle communication matched, and whether or not lane correction is possible, and consider the weight for each traveling route when correcting the position of the vehicle 1.

Determination of whether lane correction is possible may include determination of whether V2X communication is allowed and whether a lane recognition sensor is present.

More specifically, the controller 160 may calculate a weight for each traveling route by summing values of items of: whether or not a driver of the other vehicle 200 drives, the traveling trajectory of the other vehicle, whether or not there is another vehicle communication matched, and whether or not lane correction is possible.

The controller 160 may calculate a weight for each traveling route according to Equation (1) below.

Weight=Whether or not a driver drives+Whether or not the traveling trajectory of another vehicle is acquired+Whether or not there is another vehicle V2X communication matched+Whether or not lane correction is possible (Whether or not V2X communication is allowed+whether or not a lane recognition sensor is present)   (1)

The weight may be set to a value in a range of 0 to 4 for each traveling route.

When there are N straight routes, the weight may be expressed as Weight [N].

Also, the controller 160 may normalize the weight for each traveling route.

More specifically, the weight may be normalized and changed to Nor_Weight [N].

The normalized weight may be expressed according to Equation (2) below.

Nor_Weight[N]=Weight[N]/SUM(Weight[1, . . . N]),
where Nor_Weight[N] may have a value from 0 to 1.   (2)

Also, the controller 160 may apply the normalized weight for each traveling route to a gradient difference and position correction vectors for a width-direction position and a traveling-direction position for the traveling route to thereby correct the position of the vehicle.

For example, if a gradient difference matched for each traveling route is expressed as Angle[i] and position correction vectors on the global coordinate system are expressed as DIFF_x[i] and DIFF_y[i], a gradient value to be corrected may be Mod_A=SUM(Nor_Weight[i]*Angle[i]), a position corrected value in the traveling direction may be Mod_X=SUM(Nor_Weight[i]*DIFF_x[i]), and a position corrected value in the width direction may be Mod_Y=SUM (Nor_Weight[i]*DIFF_y[i]).

If a value of heading of the corresponding route on the map with respect to heading of the vehicle is fabs (heading) <0+threshold or fabs (heading)<180−threshold, the heading value may be used to correct the position in the width direction, and if fabs (heading)=90±threshold, the heading value may be used to correct the position in the traveling direction. If the heading value is another value, the heading value may be used to correct the positions in the traveling direction and in the width direction.

That is, the controller 160 may correct Mod_A, Mod_X, and Mod_Y with respect to the current position of the vehicle 1, thereby correcting the position of the vehicle 1 to a final position.

The controller 160 may be implemented with memory (not shown) to store algorithms for controlling the operations of components in the location estimation apparatus 100 or data for programs for executing the algorithms, and a processor (not shown) to perform the above-described operations using the data stored in the memory. The memory and the processor may be implemented as separate chips or as a single chip.

Figure 15:
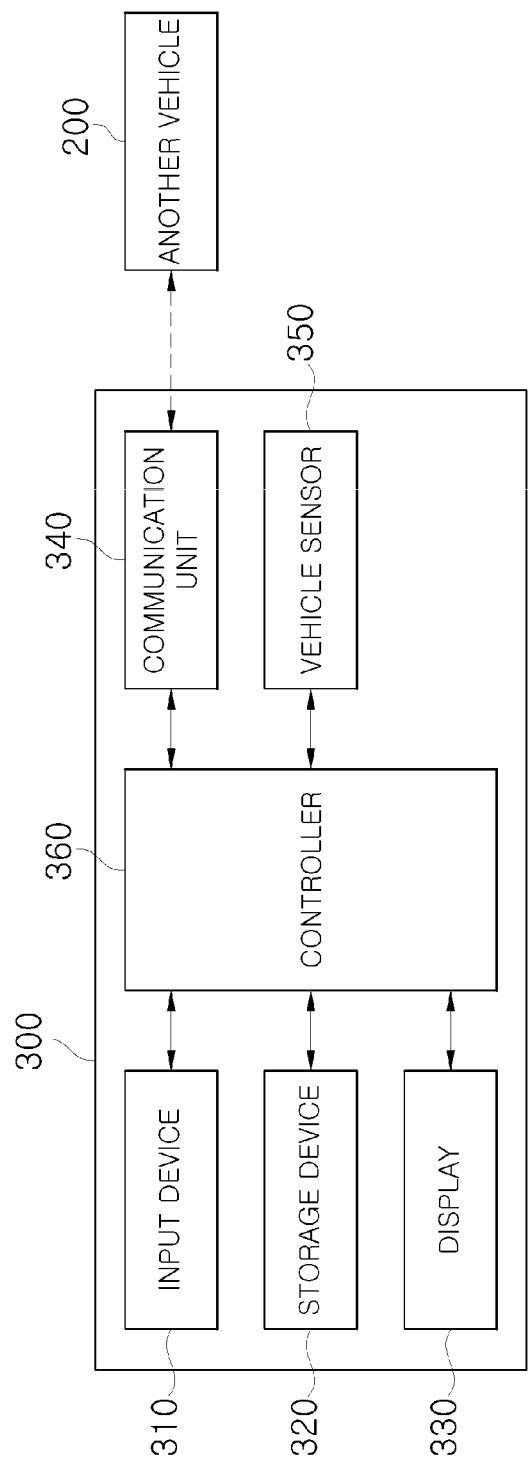
FIG. 15 is a block diagram showing the configuration of the vehicle.

FIG. 15 is a control block diagram showing the configuration of the vehicle in detail.

Hereinafter, a detailed description about the same configuration as that shown in FIG. 3 will be omitted.

Referring to FIG. 15, a vehicle 300 may include an input device 310, a storage device 320, a display 330, a communication unit 340, a vehicle sensor 350, and a controller 360.

The input device 310 may include a hardware device for receiving a user's inputs, such as a plurality of buttons or switches, a pedal, a keyboard, a mouse, a track ball, various levers, a handle, or a stick.

Also, the input device 310 may include a software device for receiving the user's inputs, such as a GUI including a touch pad, etc. The touch pad may be implemented with a touch screen panel (TSP), thus forming an interlayer structure with the display 130.

The storage device 320 may store various information related to the vehicle 300. For example, the storage device 120 may include a map, criterion for estimating the position of the vehicle 300, traveling information transmitted from another vehicle 200, and the like.

The display 330 may display various information related to the vehicle 300.

The communication unit 340 may receive traveling information of the other vehicle 200 from the other vehicle 200. The communication unit 340 may perform V2X communication with the other vehicle 200. The V2X communication is vehicular communication system technology for enabling a vehicle to exchange or share information such as traffic conditions with other vehicles by communicating with road infrastructure and the other vehicles during traveling.

The vehicle sensor 350 may detect the vehicle 300 and the other vehicle 200.

The vehicle sensor 150 may include a camera, a radar sensor, a lidar sensor, an ultrasonic sensor, and the like, for detecting the driving state of the vehicle 300 or the other vehicle 200. Also, the vehicle sensor 350 may further include a SAS, a WSS, a yaw rate sensor, a GPS sensor, a lane recognition sensor, etc.

The controller 360 may detect the position of the vehicle 300 and the traveling trajectory of the other vehicle 200, based on information of vehicles detected from the vehicle sensor 350 and traveling information of the other vehicle 200, transmitted from the other vehicle 200, predict an expected traveling route of the other vehicle 200, and match the expected traveling route of the other vehicle 200 with an expected traveling route on the map, thereby correcting the position of the vehicle 300.

The information of vehicles, detected from the vehicle sensor 350 may include at least one of the relative coordinates and speed of the other vehicle 200 with respect to the vehicle 300.

The traveling information of the other vehicle 200 may include at least one of the absolute coordinates, travel mode, yaw rate, speed, and traveling lane information of the other vehicle 200.

The controller 360 may predict an expected traveling route of the other vehicle 200 using the yaw rate and the speed of the other vehicle 200 transmitted from the other vehicle 200.

The controller 360 may detect a traveling trajectory of a valid vehicle 200 in consideration of whether or not the vehicle 200 is capable of performing V2X communication and whether or not the other vehicle 200 includes a lane recognition sensor.

The controller 360 may assign a weight for each traveling route in consideration of whether or not a driver of the other vehicle 200 drives, the traveling trajectory of the other vehicle 200, whether or not there is another vehicle communication matched, and whether or not lane correction is possible, and consider the weight for each traveling route when correcting the position of the vehicle 300.

Determination of whether or not lane correction is possible may include determination of whether or not V2X communication is allowed and whether or not a lane recognition sensor is present.

More specifically, the controller 360 may calculate a weight for each traveling route by summing values of items of: whether or not a driver drives, the traveling trajectory of the other vehicle 200, whether or not there is another vehicle communication matched, and whether or not lane correction is possible.

The controller 360 may normalize the weight for each traveling route.

Also, the controller 360 may applying the normalized weight for each traveling route to a gradient difference and position correction vectors for a width-direction position and a traveling-direction position for the traveling route to thereby correct the position of the vehicle 300.

Figure 16:
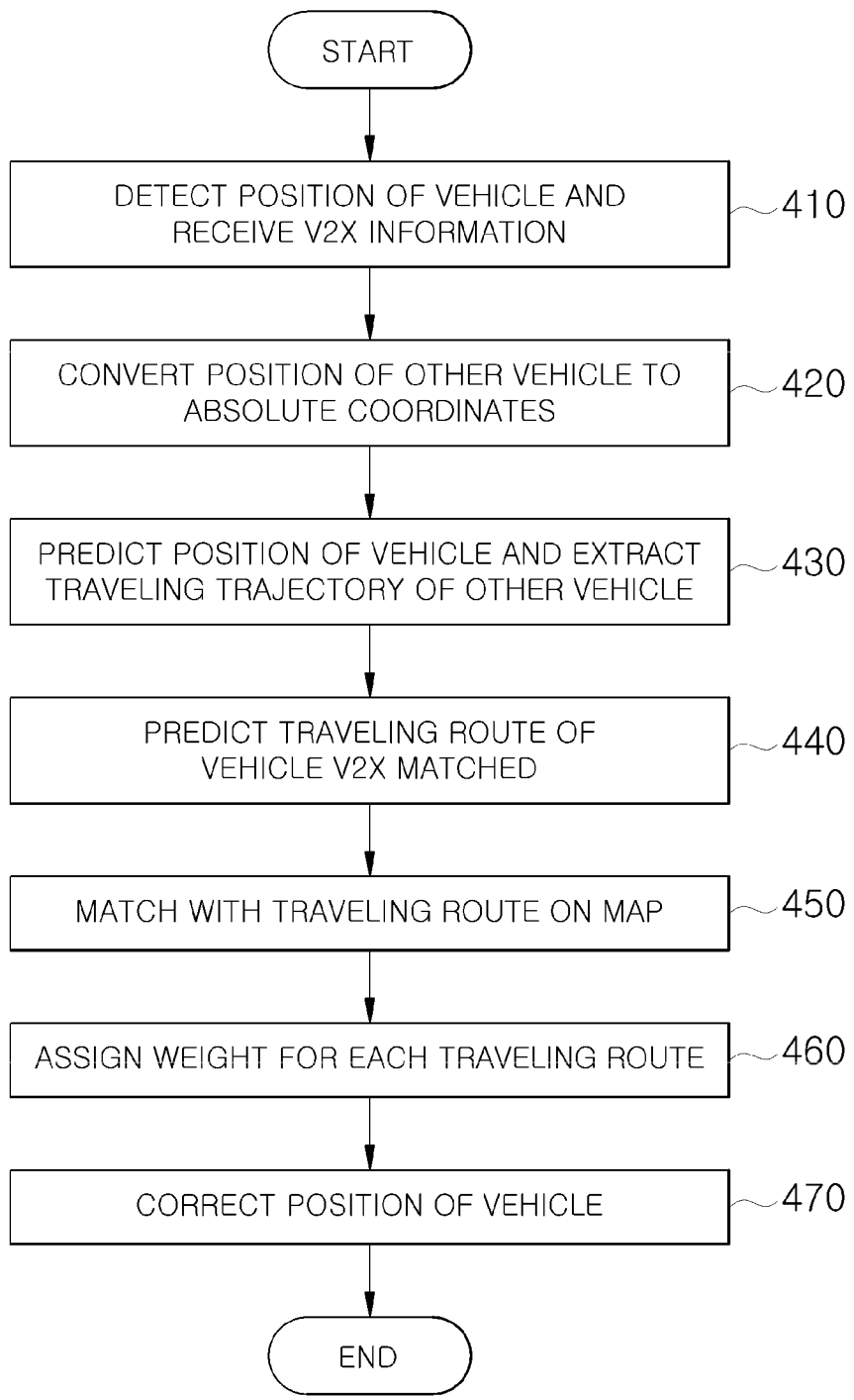
FIGS. 16 and 17 are flowcharts depicting a vehicle position estimation method.
Figure 17:
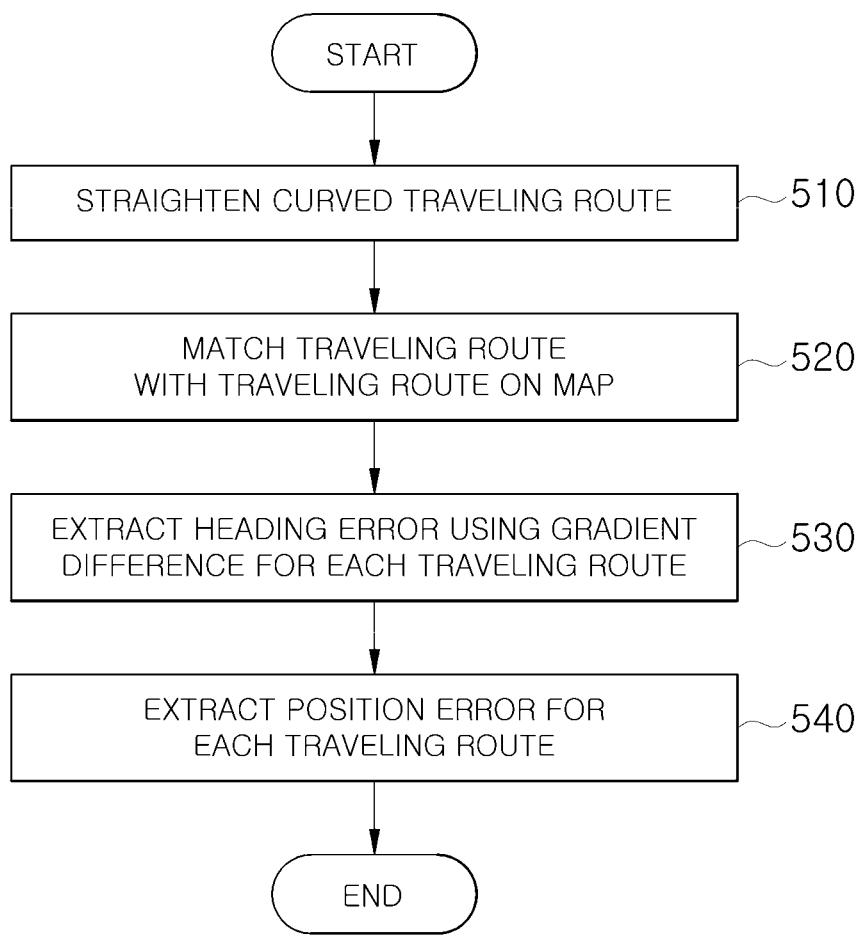

FIGS. 16 and 17 are flowcharts describing a vehicle position estimation method.

Referring to FIG. 16, the position estimation apparatus 100 may detect information of vehicles through the vehicle sensor 150 provided in the vehicle 1, or acquire traveling information of another vehicle 200 through communication with the other vehicle 200, in operation 410.

The information of vehicles may include information of the vehicle 1 and information of the other vehicle 200. The information of the other vehicle 200 may include at least one of the relative coordinates and speed of the other vehicle 200 with respect to the vehicle 1.

The position estimation apparatus 100 may receive traveling information of the other vehicle 200, transmitted from the other vehicle 200, through V2X communication with the other vehicle 200.

The traveling information of the other vehicle 200 may include at least one of the absolute coordinates, traveling mode, yaw rate, speed, and traveling lane information of the other vehicle 200.

Then, the position estimation apparatus 100 may convert the position of the other vehicle 200 into absolute coordinates, using the information of vehicles detected through the vehicle sensor 150 and the traveling information of the other vehicle 200, in operation 420.

More specifically, the position (relative coordinates) of the other vehicle 200, measured through the vehicle sensor 150 of the vehicle 1 may be more accurate than a GPS position (absolute coordinates) measured by the other vehicle 200. Therefore, the position estimating apparatus 100 may combine the relative coordinates of the other vehicle 200 measured by the vehicle sensor 150 of the vehicle 1 with the absolute coordinates of the other vehicle 200 measured by the other vehicle 200, and then convert the position of the other vehicle 200 into absolute coordinates in consideration of the coordinates of the vehicle 1.

Then, the position estimation apparatus 100 may detect the position of the vehicle 300 and a traveling trajectory of the other vehicle 200 based on the information of vehicles and the traveling information of the other vehicle 200, in operation 430.

The position estimation apparatus 100 may detect a traveling trajectory of a valid vehicle 200 in consideration of whether or not the other vehicle 200 is capable of performing V2X communication and whether or not the other vehicle 200 includes a lane recognition sensor. That is, the position estimation apparatus 100 may detect a traveling trajectory of a valid vehicle 200 that may be used to correct the position of the vehicle 1, among a plurality of detected other vehicles 200.

Then, the position estimation apparatus 100 may predict an expected traveling route of the other vehicle 200, in operation 440. The position estimation apparatus 100 may predict an expected traveling route of the other vehicle 200 using the yaw rate and speed of the other vehicle 200 transmitted from the other vehicle 200. For this, the other vehicle 200 may transmit the yaw rate and the speed to the position estimation apparatus 100 at predetermined time intervals through V2X communication.

Then, the position estimation apparatus 100 may match the predicted traveling route of the other vehicle 200 with an expected traveling route on the map to extract position correction information for each traveling route, in operation 450.

More specifically, the position estimation apparatus 100 may straighten the predicted traveling route of the other vehicle 200 in the shape of a curved line, in operation 510, and match the resultant predicted traveling route with the expected traveling route on the map for each traveling route, in operation 520.

At this time, the position estimation apparatus 100 may match the predicted traveling route of the other vehicle 200 with the expected traveling route on the map for each traveling route, based on an angle formed between the corresponding straight lines and a distance error.

Then, the position estimation apparatus 100 may extract heading information of the vehicle 1 using a gradient difference for each traveling route, in operation 530, and extract position error information in the width direction and in the traveling direction for each traveling route, in operation 540. Herein, the heading information of the vehicle 300 may mean an angle indicating the traveling direction of the vehicle, formed in a clockwise direction with respect to the north.

Referring to FIG. 13, the position estimation apparatus 100 may extract position correction information after matching because the gradients and the distance differences of straight-line sections R5 and R5', R6 and R6', R7 and R7', and R8 and R8' in the traveling route are within reference values. If the gradients and distance differences of the straight-line sections R5 and R5', R6 and R6', R7 and R7', and R8 and R8' exceed the reference values, the position estimation apparatus 100 may perform the straightening process again.

Then, the position estimation apparatus 100 may assign a weight for each traveling route in consideration of whether or not a driver of the other vehicle 200 drives, the traveling trajectory of the other vehicle 200, whether or not there is another vehicle communication matched, and whether or not lane correction is possible, in operation 460. The traveling trajectory of the other vehicle 200 may be a traveling trajectory of a front vehicle, although not limited thereto.

Operation of assigning a weight for each traveling route may include operation of calculating a weight for each traveling route by summing values of items of: whether or not a driver drives, the traveling trajectory of the other vehicle 200, whether or not there is another vehicle communication matched, and whether or not lane correction is possible, and of normalizing the weight for each traveling route.

Then, the position estimation apparatus 100 may correct the position of the vehicle 1 based on the position correction information for each traveling route, in operation 470.

At this time, the position estimation apparatus 100 may correct the position of the vehicle 1 by considering the weight for each traveling route in connection with the position correction information for each traveling route.

More specifically, the operation of correcting the position of the vehicle 300 may be an operation of applying the normalized weight for each traveling route to a gradient difference and position correction vectors of a width-direction position and a traveling-direction position for the traveling route to thereby correct the position of the vehicle 1.

As is apparent from the above description, because the apparatus and method for estimating the position of the vehicle and the vehicle using the same in accordance with the embodiments of the present disclosure may detect the vehicle and another vehicle through a sensor mounted on the vehicle, detect a traveling trajectory and a predicted traveling route of the other vehicle using traveling information of the other vehicle obtained from the other vehicle through V2X communication, and estimate the position of the vehicle based on the traveling trajectory and the predicted traveling route of the other vehicle, it is possible to more accurately estimate the location of the vehicle than in the typical technique.

Also, the apparatus and method for estimating the position of the vehicle and the vehicle using the same in accordance with the embodiments of the present disclosure may correct information about the location of the vehicle based on the traveling trajectory of another vehicle.

Also, because the apparatus and method for estimating the position of the vehicle and the vehicle using the same in accordance with the embodiments of the present disclosure may recognize the position of the vehicle based on the traveling trajectories of other vehicles, it is possible to improve the reliability of position recognition results.

In addition, the apparatus and method for estimating the location of the vehicle and the vehicle using the same in accordance with the embodiments of the present disclosure may estimate the position of the vehicle by predicting the traveling trajectory of a rear vehicle through V2X communication, even when there is no vehicle ahead or when there is no lane or building to be recognized.

Meanwhile, the above-described embodiments may be embodied in the form of recording medium that stores commands executable by a computer. The commands may be stored in the form of program codes, and when executed by a processor, the commands may create a program module to perform the operations of the above-described embodiments. The recording medium may be embodied as computer-readable recording medium.

The computer-readable recording medium includes all kinds of recording medium that store commands interpretable by a computer. For example, the computer-readable recording medium may be ROM, RAM, a magnetic tape, a magnetic tape, a magnetic disk, flash memory, or an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle position estimation apparatus comprising:
a vehicle sensor configured to detect a vehicle;
a communication unit configured to receive traveling information of a further vehicle from the further vehicle; and
a controller configured to detect a position of the vehicle and a traveling trajectory of the further vehicle based on information of vehicles detected by the vehicle sensor and traveling information of the further vehicle transmitted from the further vehicle, and to predict a traveling route of the further vehicle, to match the predicted traveling route of the further vehicle with an expected traveling route on a map, thereby correcting the position of the vehicle,
wherein the traveling information of the further vehicle includes at least one of absolute coordinates, a travel mode, a yaw rate, speed, and travel lane information of the further vehicle, and
wherein the controller predicts the traveling route of the further vehicle using the yaw rate and the speed of the further vehicle transmitted from the further vehicle.

2. The vehicle position estimation apparatus according to claim 1, wherein the information of vehicles detected by the vehicle sensor includes at least one of relative coordinates and speed of the further vehicle with respect to the vehicle.

3. The vehicle position estimation apparatus according to claim 1, wherein the communication unit performs Vehicle to Everything (V2X) communication with the further vehicle.

4. The vehicle location estimation apparatus according to claim 3, wherein the controller detects a traveling trajectory of the further vehicle determined as a valid vehicle in consideration of whether or not the further vehicle allows V2X communication and whether or not the further vehicle includes a lane recognition sensor.

5. The vehicle position estimation apparatus according to claim 1, wherein the controller assigns a weight for the predicted traveling route in consideration of whether or not a driver of the further vehicle drives, the traveling trajectory of the further vehicle, whether or not there is another vehicle communication matched, and whether or not lane correction is possible, and considers the weight for the predicted traveling route when correcting the position of the vehicle.

6. The vehicle position estimation apparatus according to claim 5, wherein determination of whether lane correction is possible includes determination of whether or not Vehicle to Everything (V2X) communication is allowed and whether or not a lane recognition sensor is present.

7. The vehicle position estimation apparatus according to claim 5, wherein the controller calculates the weight for the predicted traveling route by summing values of items including whether or not a driver drives, the traveling trajectory of the further vehicle, whether or not there is another vehicle communication matched, and whether or not lane correction is possible.

8. The vehicle position estimation apparatus according to claim 7, wherein the controller normalizes the weight for the predicted traveling route.

9. The vehicle position estimation apparatus according to claim 8, wherein the controller applies the normalized weight for the predicted traveling route to a gradient difference and position correction vectors of a width-direction position and a traveling-direction position for the predicted traveling route to thereby correct the position of the vehicle.

10. A method of estimating a position of a vehicle, the method comprising:
  detecting information of vehicles through a vehicle sensor provided in the vehicle, or acquiring traveling information of a further vehicle through communication with the further vehicle, wherein the traveling information of the further vehicle includes at least one of absolute coordinates, a travel mode, a yaw rate, speed, and travel lane information of the further vehicle;
  converting a position of the further vehicle into absolute coordinates using the information of vehicles detected through the vehicle sensor and the traveling information of the further vehicle;
  detecting a position of the vehicle and a traveling trajectory of the further vehicle based on the information of vehicles and the traveling information of the further vehicle;
  predicting a traveling route of the further vehicle;
  matching the predicted traveling route of the further vehicle with an expected traveling route on a map to extract position correction information for the predicted traveling route;
  correcting the position of the vehicle based on the position correction information for the predicted traveling route; and
  predicting the traveling route of the further vehicle using the yaw rate and the speed of the further vehicle transmitted from the further vehicle.

11. The method according to claim 10, wherein the traveling information of the further vehicle includes at least one of absolute coordinates, a traveling mode, a yaw rate, speed, and traveling lane information of the further vehicle.

12. The method according to claim 11, wherein predicting of the traveling route of the further vehicle comprises predicting the traveling route of the further vehicle using the yaw rate and the speed of the further vehicle transmitted from the further vehicle.

13. The method according to claim 11, wherein acquiring the traveling information of the further vehicle comprises receiving the traveling information of the further vehicle transmitted from the further vehicle through Vehicle to Everything (V2X) communication with the further vehicle.

14. The method according to claim 13, wherein detecting of the traveling trajectory of the further vehicle comprises detecting the traveling trajectory of the further vehicle determined as a valid vehicle in consideration of whether or not the further vehicle allows V2X communication and whether or not the further vehicle includes a lane recognition sensor.

15. The method according to claim 10, before extracting the position correction information for the predicted traveling route to correct the position of the vehicle, further comprising assigning a weight for the predicted traveling route in consideration of whether or not a driver of the further vehicle drives, the traveling trajectory of the further vehicle, whether or not there is another vehicle communication matched, and whether or not lane correction is possible,
  wherein correcting the position of the vehicle comprises considering the weight for the predicted traveling route in connection with the position correction information for the predicted traveling route.

16. The method according to claim 15, wherein assigning the weight for the predicted traveling route comprises:
  calculating the weight for the predicted traveling route by summing values of items including whether or not a driver drives, the traveling trajectory of the further vehicle, whether or not there is another vehicle communication matched, and whether or not lane correction is possible; and
  normalizing the weight for the predicted traveling route.

17. The method according to claim 16, wherein correcting the position of the vehicle comprises applying the normalized weight for the predicted traveling route to a gradient difference and position correction vectors of a width-direction position and a traveling-direction position for the predicted traveling route to thereby correct the position of the vehicle.

18. A vehicle comprising:
  a vehicle sensor configured to detect the vehicle and a further vehicle;
  a communication unit configured to receive traveling information of the further vehicle from the further vehicle; and
  a controller configured to detect a position of the vehicle and a traveling trajectory of the further vehicle based on information of vehicles detected by the vehicle sensor and the traveling information of the further vehicle transmitted from the further vehicle, to predict a traveling route of the further vehicle, and to match the predicted traveling route of the further vehicle with an expected traveling route on a map, thereby correcting the position of the vehicle, wherein the traveling information of the further vehicle includes at least one of absolute coordinates, a travel mode, a yaw rate, speed, and travel lane information of the further vehicle, and wherein the controller predicts the traveling route of the further vehicle using the yaw rate and the speed of the further vehicle transmitted from the further vehicle.

19. The vehicle according to claim 18, wherein the controller assigns a weight for the predicted traveling route in consideration of whether or not a driver of the further vehicle drives, the traveling trajectory of the further vehicle, whether or not there is another vehicle communication matched, and whether or not lane correction is possible, and considers the weight for the predicted traveling route when correcting the position of the vehicle.

20. The vehicle according to claim 18, wherein the communication unit performs Vehicle to Everything (V2X) communication with the further vehicle.

* * * * *